United States Patent
Steimel

(10) Patent No.: US 7,447,112 B2
(45) Date of Patent: Nov. 4, 2008

(54) TEST METHOD FOR A METHOD FOR PASSIVELY OBTAINING TARGET PARAMETERS

(75) Inventor: Ulrich Steimel, Oyten (DE)

(73) Assignee: Atlas Elektronik GmbH, Bremen (DE)

( * ) Notice: Subject to any disclaimer, the term of this patent is extended or adjusted under 35 U.S.C. 154(b) by 64 days.

(21) Appl. No.: 11/578,121

(22) PCT Filed: Apr. 27, 2005

(86) PCT No.: PCT/EP2005/004476

§ 371 (c)(1),
(2), (4) Date: Oct. 10, 2006

(87) PCT Pub. No.: WO2005/119291

PCT Pub. Date: Dec. 15, 2005

(65) Prior Publication Data

US 2008/0034871 A1     Feb. 14, 2008

(30) Foreign Application Priority Data

May 28, 2004  (DE) ...................... 10 2004 026 304

(51) Int. Cl.
*G01S 15/18* (2006.01)
*G01S 3/80* (2006.01)
*G01S 5/00* (2006.01)

(52) U.S. Cl. ........................................................ 367/13
(58) Field of Classification Search ................... 367/13, 367/118
See application file for complete search history.

(56) References Cited

U.S. PATENT DOCUMENTS 5,740,049 A * 4/1998 Kaise .......................... 701/217
5,993,050 A * 11/1999 Miura ............................ 703/2

FOREIGN PATENT DOCUMENTS

DE      42 13 121      10/1993

(Continued)

OTHER PUBLICATIONS

International Search Report.

(Continued)

*Primary Examiner*—Dan Pihulic
(74) *Attorney, Agent, or Firm*—Fitch, Even, Tabin & Flannery; Norman N. Kunitz

(57) ABSTRACT

A test method for a method used for passively obtaining target data regarding a moving target, wherein bearing angles are measured as real target data from the bearing of the target using an on-board bearing system at successive path positions of a vehicle that determines its path positions using a compound navigation system, and distance, speed, course, and/or position of the target are determined therefrom. To verify this method, target and vehicle positions are measured using a GPS at the time the bearings of the target are taken. Target bearing angle and distances are calculated from the respectively associated positions of the vehicle and the target and are allocated to the path positions measured using compound navigation. A reference target path is estimated therefrom, and from associated pairs of values of the bearing angle and the target distance, and reference target data is derived therefrom and directly compared to the real target data.

4 Claims, 1 Drawing Sheet

FOREIGN PATENT DOCUMENTS

| | | |
|---|---|---|
| DE | 44 31 851 | 3/1996 |
| DE | 101 29 726 | 1/2003 |
| GB | 2213339 A * | 8/1989 |
| WO | WO 01/42812 * | 6/2001 |

OTHER PUBLICATIONS

Joost H. De Vlieger, "Maximum Likelihood Estimation for Long-Range Target Tracking Using Passive Sonar Measurements"; IEEE Transactionss on Signal Processing, vol. 40, No. 5, May 1992.

* cited by examiner

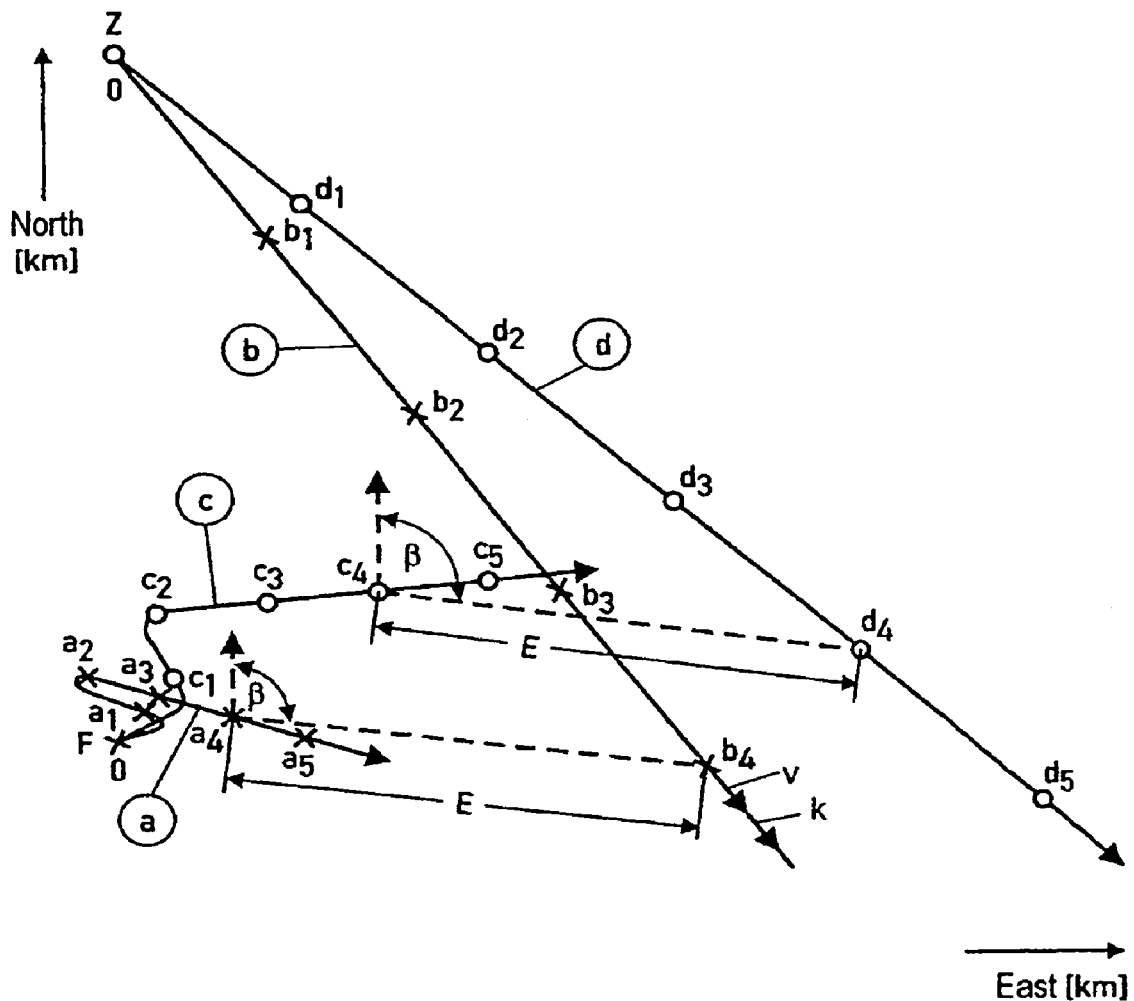

US 7,447,112 B2

TEST METHOD FOR A METHOD FOR PASSIVELY OBTAINING TARGET PARAMETERS

CROSS REFERENCE TO RELATED APPLICATION

This application is the National Stage filing under 35 U.S.C. 371 of International Application No. PCT/EP2005/004476, filed Apr. 27, 2005, and claims priority of German Patent Application Number 10 2004 026 304.3, filed May 28, 2004, which is incorporated herein, in its entirety, by reference.

BACKGROUND OF THE INVENTION

The invention relates to a test method for a method for passively obtaining target data about a moving target which is emitting wave energy, in particular sound, by means of which direction angles are measured as actual target data at successive track positions of a vehicle, in particular of a water vehicle, which determines its track positions using an on-board autonomous navigation system, in particular an integrated navigation system, by finding the direction of the target by means of an on-board-based direction-finding system, with the target range, the target velocity, the target course and/or the target position being determined from this as further actual target data.

In order to determine the position, the velocity and the course of a target, for example of a surface vessel, of a submarine or of a torpedo, as so-called target data from a vehicle, for example a submarine or a surface vessel, without revealing itself, in the case of a method which is known as a TMA (target motion analysis) method for passive target data determination (DE 101 29 726 A1) sound which is emitted from the target is received by a sonar direction-finding system, and the direction angle to the target is measured. Starting from an initial position, a position of the target is estimated from this direction angle together with the track position of the vehicle or the vehicle's own position, with this position being that which the target which is moving at an estimated target velocity will assume after a time interval, and an associated estimated direction angle is calculated. The difference between the measured direction angle and the estimated direction angle is reduced iteratively until an error limit is undershot, that is to say, the estimated direction angle corresponds to the measured direction angle, except for the error tolerance. The basic estimated position is identified as the target position. The estimated range to the target, the target velocity and the target course are calculated from the direction angle and the target position. The vehicle's own positions and track positions are determined in a known manner by means of an on-board autonomous navigation system, normally by means of an integrated navigation system, by means of which the direction of travel and the distance traveled are determined by measuring the velocity of the vehicle. The velocity is determined by a Doppler log, for which wave energy is transmitted directionally and is received, Doppler-shifted, after reflection on the ground or on layers in the transmission medium. The Doppler shift is a measure of the velocity. Doppler logs on water vehicles transmit sound waves which are reflected from the seabed, in the case of the "bottom track", and from water layers, in the case of the "water track". In the case of the "water track", the integrated navigation uses the flow in the measurement region to produce dependent track positions which are subject to flow and are corrected by flow data from flow atlases, in order to determine the vehicle's own true position from the measured track position.

A so-called SAT (sea acceptance test) is carried out in order to verify the validity of a TMA method such as this, in which the directions of one or more targets from the vehicle are found using one or more sensors in a sonar direction-finding system. When using the TMA method, target ranges and target velocity, target course and target position are estimated as target data from the north-related direction angles obtained from the directions that are found, which target data must reach specific error tolerances for validation after a specific run-in time.

The invention is based on the object of specifying a test method which can be used with an SAT and by means of which the acceptability of a method for passively determining target data can be determined quickly and preferably on-line.

SUMMARY OF THE INVENTION

According to the invention, the object is achieved by the features of claim 1.

The method according to the invention has the advantage that the validity of the method to be tested can be assessed even during the test run at sea and, if the results are inadequate, can be followed by one or more repeat tests immediately, so that the SAT is restricted in time. This results in a considerable cost saving since every day which is required at sea with one's own vessel for the SAT as the vehicle to which the direction-finding system is fitted and with one or more target ships is associated with high costs. The land-based or satellite-based position-finding measurement system on one's own vessel on the surface and target ship which is used as a reference target produces earth-related position values of high accuracy, from which it is possible to calculate very exact absolute values for the direction angle and target range. These absolute values of the direction angle and target range, which have been determined at the same times as the directions found by the direction-finding system for the TMA method, are associated with the track positions which the vehicle has determined using the on-board autonomous navigation system at the times in which the directions were found for the TMA method. The track positions and the value pairs associated with them are used to calculate target positions, from which a smoothed reference target track is estimated for example by means of Kalman filters. Reference direction angles, a reference target position, reference target ranges, a reference target velocity and/or a reference target course are/is derived from the reference target track and are/is compared with the corresponding actual target data obtained using the TMA method. If the discrepancy between the reference values and the actual values is converging to a predetermined error, the test result is positive. This procedure makes it possible to assess the so-called actual target data estimated using the TMA method by direct comparison with the reference target data. Since the same track of one's own vehicle, along which the TMA method is used, is used to calculate the reference target track, there is no need to take account of the environmental influences. For example, there is thus no need to carry out direction calculations in order to eliminate, for example, the effect of a current flow on the vehicle, which influences the track positions determined by the on-board autonomous navigation system, as in the case of known test methods.

Furthermore, it is possible, if the details of the position values of the target are subject to disturbances, for example as a result of disturbances in the radio link between the target and the vehicle, to store all of the measured direction angles and actual target data derived from them, and to carry out further test runs. The stored target data can be read in again at any time, thus completing the interrupted acceptance run.

The test method according to the invention also offers the advantage that the convergence of the target data estimated using the TMA method with the predetermined error tolerance can be assessed on-line.

Expedient embodiments of the method according to the invention, as well as advantageous developments and refinements of the invention, are specified in the further claims.

BRIEF DESCRIPTION OF THE DRAWINGS

The invention will be explained in more detail in the following text with reference to one exemplary embodiment, which is illustrated in the drawing. In this case, the drawing shows an SAT scenario in a sea region with a moving vehicle F and a moving target Z.

DETAILED DESCRIPTION OF THE INVENTION

The vehicle F has a sonar receiving system, by means of which sound emitted from the target Z is received. Directive signal processing is used to determine the incidence direction of the sound as the direction angle with respect to the geographic north direction, with respect to the target. The direction angle is determined at successive measurement times $t_i$ (i=0, 1, 2 . . . 5), at which the vehicle F assumes for example the track positions 0, a1 to a5 on its own track (curve a) on the basis of its speed of motion and its course, as is calculated by the vehicle by integrated navigation using gyroscopes for direction measurement, a Doppler log for velocity measurement and, possibly, acceleration and inclination measurement devices. The method test starts at the time $t_0$ with the measurement of the first direction angle to the target Z. The vehicle F has assumed the position 0 at the measurement time $t_0$. The vehicle F carries out a maneuver at the measurement times $t_1$ and $t_2$.

At the measurement time to, the target Z is located at the position 0 and its direction is found by the vehicle F, which is located at its initial position 0, to be at the direction angle 0°, in the northerly direction. The target Z travels at a constant target velocity and on a constant target track, starting from its initial position 0, on a target track d and assumes for example the respective target positions d1, d2, d3, d4 . . . at the times $t_i$, where i=1, 2, 3, 4, . . . , at which its direction is found by the vehicle F.

The method for passively determining the target data of the target Z, specifically the actual target data: target direction, target range, target position, target course and target velocity, referred to in the following text as the TMA (target motion analysis) method, estimates a position of the target Z for each of the track positions a1 to a5 of the vehicle F from the direction angle measured at the respective track position and, with the addition of an estimated velocity of the target Z, calculates an estimated direction angle, associated with that estimated position of the target Z, to the target Z. The difference between the measured and the estimated direction angles is then reduced iteratively until an error limit is undershot. The estimated position on which the undershooting of the error limit is based is emitted as the actual target position, and the estimated velocity associated with this is emitted as the actual target velocity and the actual target track. This is repeated for every track position a1 to a5 of the vehicle F at which a direction angle to the target is measured. The target track obtained by means of the TMA method results in the curve b with the target positions b1 to b4. A comprehensive description of the TMA method can be found, for example, in DE 101 29 726 A1.

In order to check the validity of the TMA method, the vehicle F which is equipped with the direction-finding system for the TMA method, for example a submarine which is moving in the semi-submerged state for the SAT, and the surface vehicle which is used as the target, for example a surface vessel, are each equipped with a GPS receiver or with a more accurate DGPS receiver for the satellite-based navigation system. The vehicle F and the target Z are linked to one another by radio. At the start of the test method, the positions of the vehicle F and of the target Z are determined with high precision by means of the GPS receivers, to be precise always at those times $t_i$ at which target directions are measured from the vehicle F using the on-board sonar receiving system, and the direction angles with respect to north are measured. The vehicle positions 0, c1 to c5 measured using the GPS receiver result in the true track of the vehicle F itself, related to earth coordinates, as shown by the curve c, and the target positions 0, d1 to d5 determined using the GPS receiver in the target Z result in the true target track, related to earth coordinates, as shown by the curve d. The target positions 0, d1 to d5 determined by the GPS receiver on the target Z are transmitted by radio to the vehicle F. The absolute direction angle with respect to north and the absolute range between the vehicle F and the target Z are calculated for the target positions 0, d1 to d5 (curve d) for each of the vehicle positions 0, c1 to c5 (curve c). By way of example, the drawing shows the calculated direction angle β and the calculated target range E for the time $t_4$, at which the vehicle F was at the position c4 (curve c), and the target Z was at the position d4 (curve d).

The calculated absolute direction angles and absolute target ranges are linked to the track positions 0, a1 to a5 (curve a) measured by the vehicle F by means of integrated navigation, that is to say in each case the value pairs calculated at the times $t_i$ (i=0 . . . 5) comprising the direction angle and the target range are associated with those track positions 0, a1 to a5 of the vehicle F which the vehicle F had assumed at the times $t_0$ to $t_5$ on the basis of the result of the integrated navigation. This is illustrated in the drawing for the time $t_4$ at which the track position a4 of the vehicle F (curve a) had been indicated by the integrated navigation, by plotting the value pair β and E at a4. A smoothed reference target track is estimated, for example by the use of a Kalman filter, using all of these value pairs and using the track positions of the vehicle F, determined by its own integrated navigation, associated with these value pairs at the correct times. Reference values for the direction (reference directions), target position (reference target positions), target range (reference target ranges), target velocity (reference target velocity) and/or target course (reference target course) are derived from the reference target track. As is illustrated in a simplified form in the drawing, this results in the reference target positions 0, b1 to b4 as entered on the reference target track b, and, as a consequence of the simplified representation, these match the actual target positions 0, b1 to b4 (curve b) determined using the TMA method. Discrepancies which are normally present are ignored in the drawing.

In order to check whether the actual target data estimated using the TMA method satisfies the accuracy requirements, that is to say specific error tolerances are achieved after a predetermined run-in time, the actual target data measured using the TMA method is compared with the corresponding reference target data, and the magnitude of the discrepancy is in each case assessed. For this purpose, by way of example, the differences between the actual direction angles and the reference direction angles on the one hand and the differences between the actual target ranges and the reference target ranges on the other hand are formed, and the time convergence of the differences is assessed. If the differences tend to zero after a predetermined time, or they reach a predetermined error tolerance, then the method to be tested has been validated. As shown in the drawing, the target data is recorded correctly despite the current flow on the track of the vehicle F (curve a) itself as measured by the vehicle in the water with respect to the true track of the vehicle F (curve c) itself on land measured by the GPS receiver, since the target is subject to a current flow in the same way. There is therefore no need to use computation methods to eliminate environmental influences, in the example a current flow in the test region, for correct testing of the TMA method, so that there is no need to know them either.

It is also possible to use a radar installed on the vehicle F to determine the target position of the target Z in the course of the test method during the SAT. The moving target Z is measured by the radar at the times $t_i$ at which the vehicle F respectively assumes the track position 0 and a1 to a5 as shown on the curve a. The radar produces direction angles and target ranges, from which a reference target track is once again estimated, for example by means of a Kalman filter. The rest of the test procedure is as described above. In principle, the radar also makes it possible to record a reference target course and reference target velocity, and to compare these with the corresponding actual target data estimated by the TMA method. Since the reference target course and reference target velocity are measured relatively inaccurately by the radar, however, this reference target data is not used for testing the TMA method.

A further option for target measurement of the SAT in order to obtain reference target data is for the target to tow a so-called sonar fish. The sonar fish contains a pulsed sound source which transmits sound pulses at a fixed transmission clock rate, and these are received by the sonar system installed on the vehicle F. The times of direction measurements from the vehicle and the transmission times of the pulsed sound source in the sonar fish are synchronized to one another. The direction angle to the sonar fish is calculated from the incidence angle of the received sound pulses, and the range between the vehicle F and the sonar fish is calculated from the delay time of the sound pulses. If the tow length of the sonar fish is known, associated target direction and target range can be calculated from these values. Using the same procedure as that described above, a smoothed reference target track is estimated using the target directions and target ranges, and said reference target data is derived from this, and is compared with the corresponding actual target data from the TMA method.

Measurement of the target by means of radar and a sonar fish is used when the position measurement by the target and the vehicle F using the GPS results in problems, for example when the target positions cannot be transmitted to the vehicle F because the radio link between the target and vehicle F is subject to disturbances.

The invention claimed is:

1. A test method for a method for passively obtaining target data about a moving target which is emitting wave energy, in particular sound, from which direction angles are measured as actual target data at successive track positions of a vehicle, in particular of a water vehicle, which determines its track positions using an on-board autonomous navigation system, in particular an integrated navigation system, by finding the direction of the target using an on-board-based direction-finding system, with the target range, the target velocity, the target course and/or the target positions being determined from this as further actual target data, wherein, at the times at which the directions to the target are determined from the vehicle, the positions of the target and vehicle are measured using a land-based and/or satellite-based position-finding measurement system, the direction angles and target ranges are calculated from the positions of the vehicle and target measured in this way and in each case associated with one another, a smoothed reference target track is estimated from the value pairs of the mutually associated, calculated direction angles and target ranges and the track positions which are associated with these value pairs at the correct time are determined using the navigation system of the vehicle, and reference direction angles, reference target positions, reference target ranges, a reference target velocity and/or a reference target course are/is derived from the reference target track and are/is compared with the corresponding actual target data, and the magnitude of the discrepancy is assessed.

2. The test method as claimed in claim 1, wherein the magnitude of the discrepancy is assessed by forming the difference and by assessing its time convergence.

3. (The test method as claimed in claim 2, wherein the positions of the target and vehicle are measured using a GPS receiver which is installed on the target and a GPS receiver which is installed on the vehicle, for the satellite-based position-finding measurement system, and the target positions are transmitted to the vehicle, preferably by radio.

4. The test method as claimed in claim 1, wherein the positions of the target and vehicle are measured using a GPS receiver which is installed on the target and a GPS receiver which is installed on the vehicle, for the satellite-based position-finding measurement system, and the target positions are transmitted to the vehicle, preferably by radio.

* * * * *